No. 701,684. Patented June 3, 1902.
L. E. COWEY.
WEIGHING APPARATUS.
(Application filed Oct. 23, 1901.)
(No Model.) 4 Sheets—Sheet I.
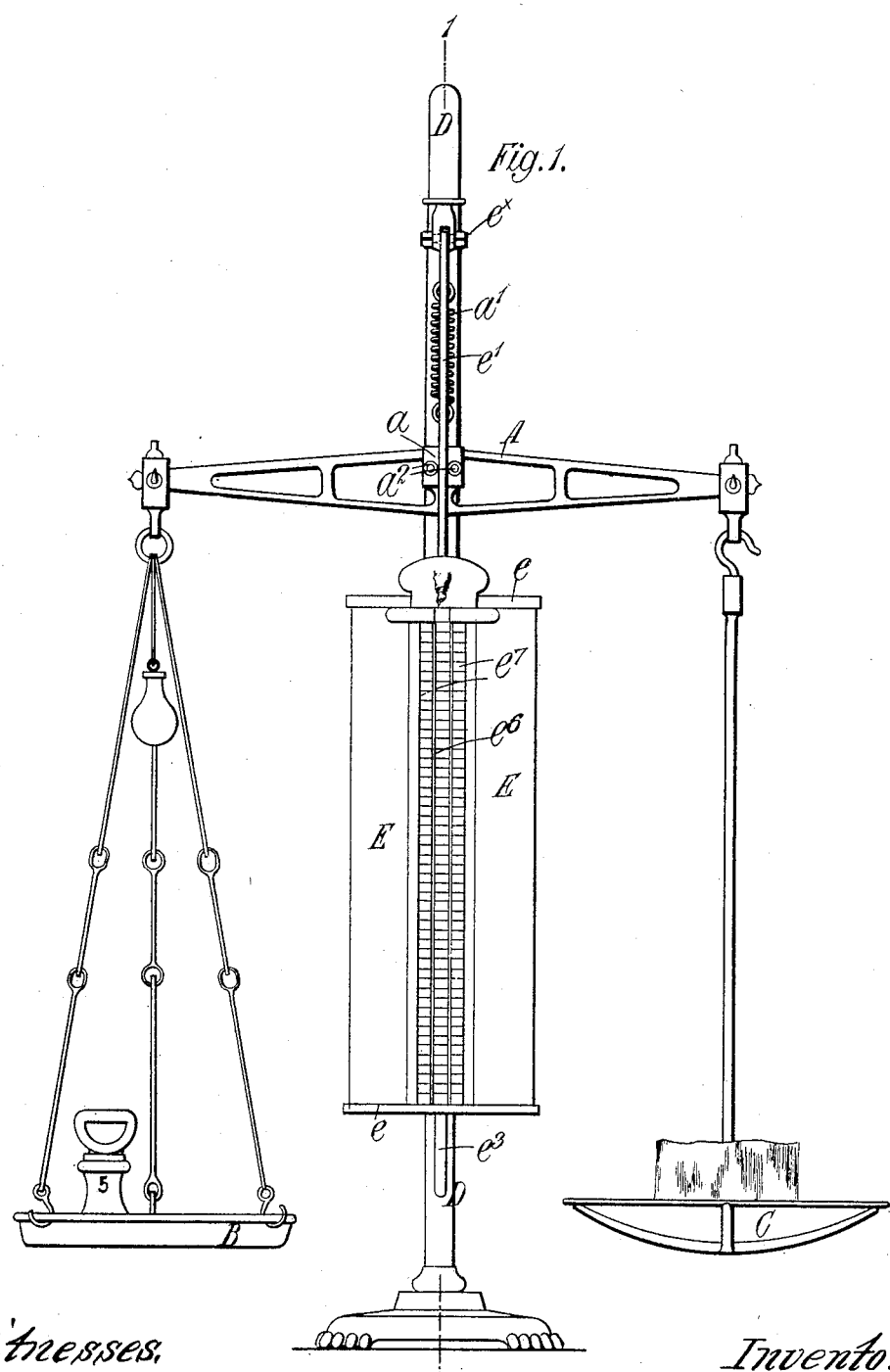
Witnesses.
Inventor.
Leonard E. Cowey,
By James L. Norris.
Atty.

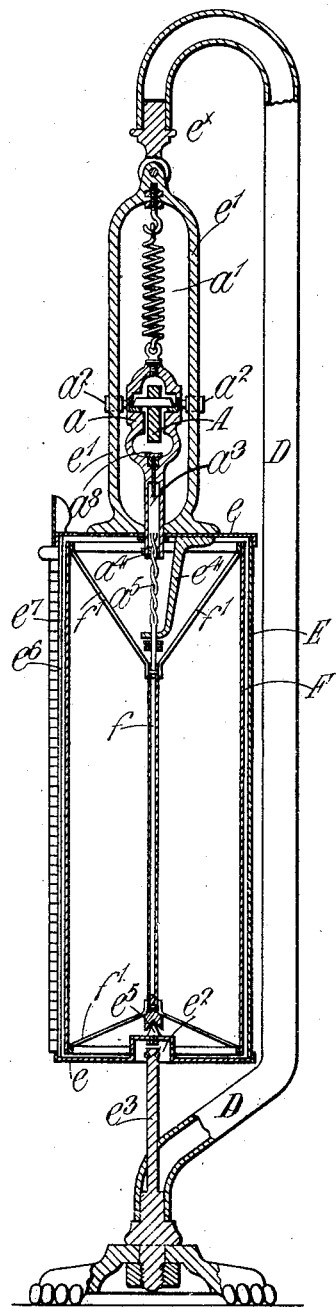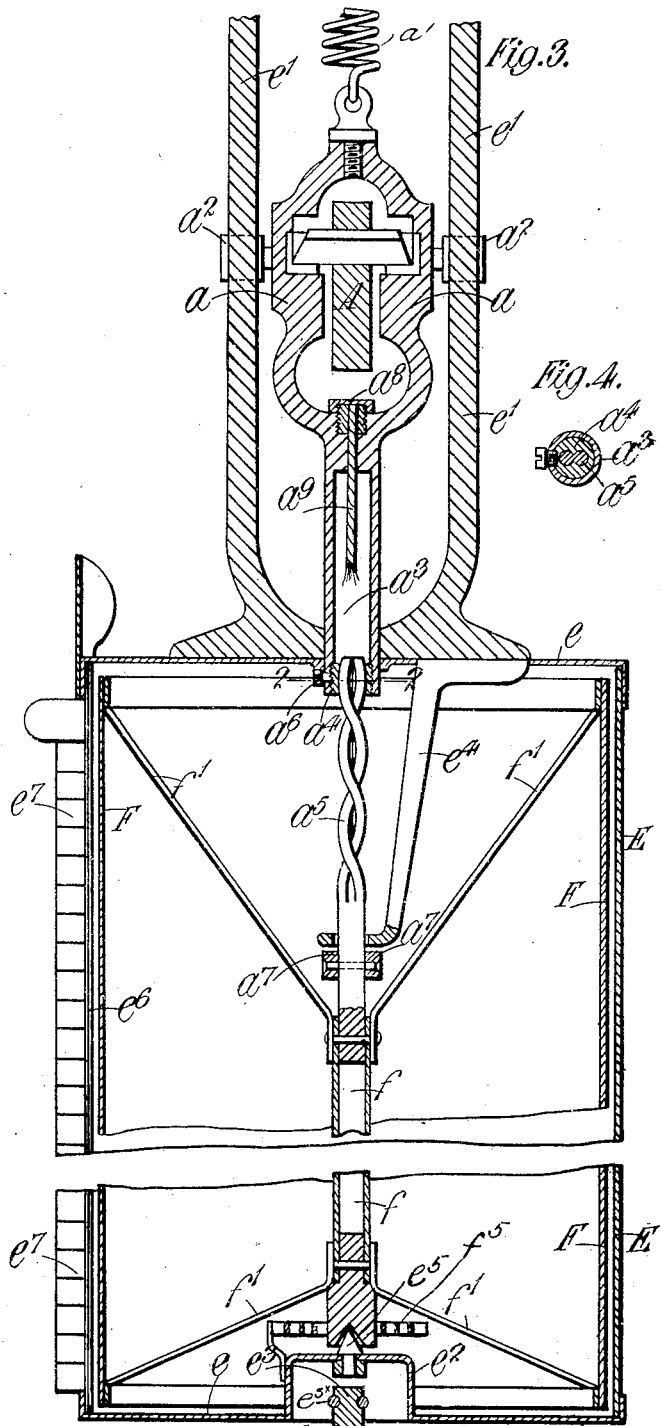

No. 701,684. Patented June 3, 1902.
L. E. COWEY.
WEIGHING APPARATUS.
(Application filed Oct. 23, 1901.)
(No Model.) 4 Sheets—Sheet 3.
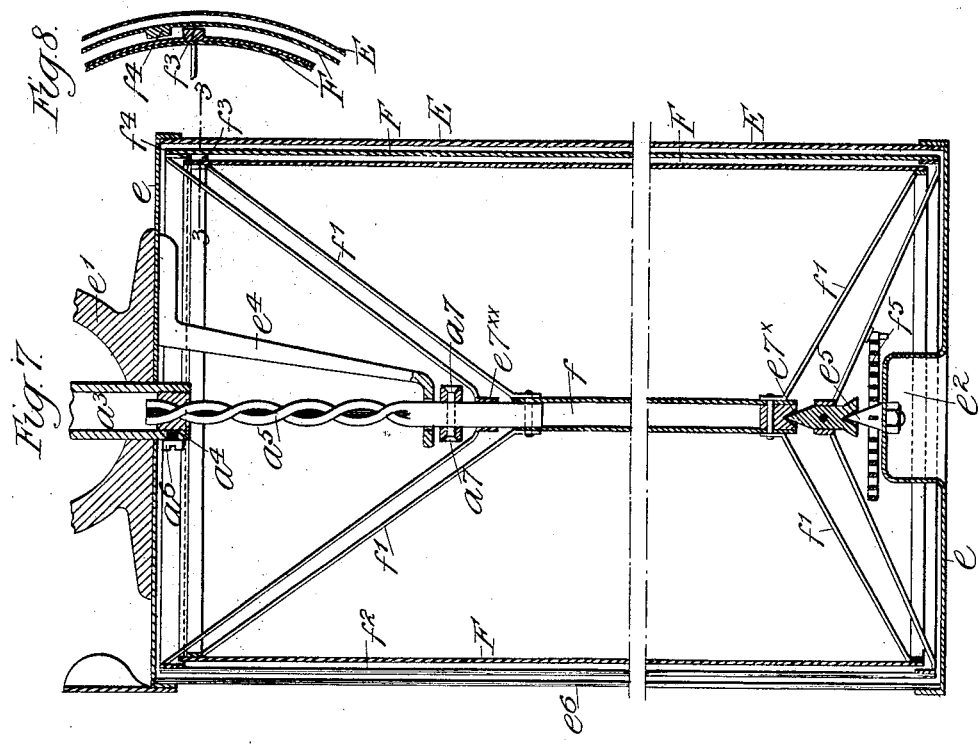

No. 701,684. Patented June 3, 1902.
L. E. COWEY.
WEIGHING APPARATUS.
(Application filed Oct. 23, 1901.)
(No Model.) 4 Sheets—Sheet 4.
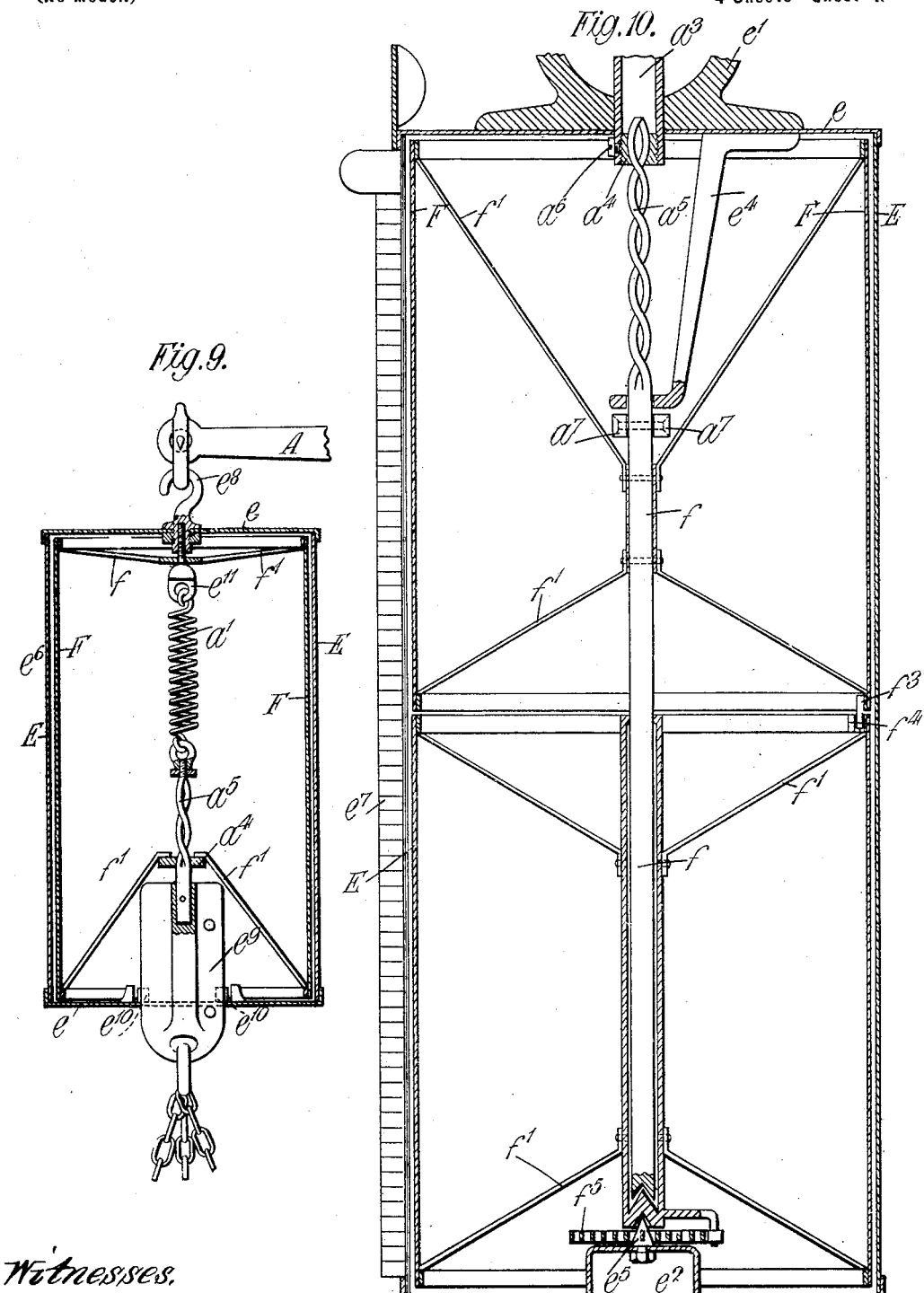
Witnesses.
Dennis Sumby.
Robert Courtt.
Inventor,
Leonard E. Cowey,
By James L. Norris.
Atty.

UNITED STATES PATENT OFFICE.

LEONARD EUGENE COWEY, OF LONDON, ENGLAND.

WEIGHING APPARATUS.

SPECIFICATION forming part of Letters Patent No. 701,684, dated June 3, 1902.

Application filed October 23, 1901. Serial No. 79,718. (No model.)

*To all whom it may concern:*

Be it known that I, LEONARD EUGENE COWEY, engineer, a subject of the King of Great Britain, residing at Clun House, Surrey street, Strand, London, England, have invented certain new and useful Improvements Relating to Weighing Apparatus, of which the following is a specification.

This invention relates to weighing apparatus, and has reference particularly to that class of such apparatus in which the weights and the goods are connected with the opposite ends of a horizontal scale-beam.

The chief object of my invention is to provide improved means for indicating at various rates the monetary value of the goods weighed.

According to my invention I so arrange the aforesaid scale-beam that its fulcrum is situated in a movable piece or slide connected, through the intervention of a spiral or other spring, to a fixed part of the weighing apparatus. The spiral or other spring is during a weighing operation more or less stretched or otherwise deflected, according to the weight acting on the scale-beam. The aforesaid movable piece or slide that carries the scale-beam is coupled to a drum of cardboard or other light material, which by any suitable contrivance interposed between the said movable slide and the drum is caused to turn about its axis to a greater or less extent, according to the amplitude of movement or extent of deflection of the aforesaid spring and the slide carrying the scale-beam. The said drum bears on its outer surface signs or figures representing the various monetary values of the different weights of the goods the apparatus is intended to deal with. The said drum is preferably contained within an outer fixed cylinder or casing, which bears figures or signs representing the rates at which the goods are to be sold. The said casing has a vertical slot through which the monetary values on the inner movable drum can be observed, and the aforesaid indications representing the rates are placed near the edge or edges of the vertical slot. The contiguity of any of the figures or signs on the movable drum representing the monetary values, with the figures or signs on the outer casing or cylinder representing the rates, would indicate at once the amount of money to be paid by a purchaser of a certain quantity of goods at a certain rate.

Where it is necessary to have a great number of values indicated by the drum, I may provide more than one drum and arrange them concentrically, each drum (with the exception of the innermost one) having a vertical slot for the indications of the inner drums to be seen through the outer ones. In this case only the innermost drum would be directly acted upon by the aforesaid moving slide carrying the scale-beam, the other drums being so arranged that by the action of a light spring or otherwise they would normally lie with their slots opposite each other. If the innermost drum were caused to turn beyond a single revolution, it would by suitable means, such as a protuberance engaging with a projection on the adjacent drum, impart rotary movement to the latter drum, which in turn would on completion of its revolution impart by similar means rotary movement to the next drum, and so on throughout the series. The aforesaid light springs would also act to return the drums to their normal position after the completion of the weighing operation. Or I may place the drums directly one above the other and so arrange them that the first drum will perform approximately a complete revolution before causing the second drum to work, and so on throughout the series.

In order that my said invention may be clearly understood and readily carried into effect, I will proceed to describe the same more fully with reference to the accompanying drawings, in which—

Figure 1 is a front elevation of my apparatus applied to a pair of scales of the kind ordinarily employed by grocers and provision salesmen. Fig. 2 is a vertical section on the line 1 1 of Fig. 1. Fig. 3 is a vertical section, on a larger scale, showing the chief operative parts of my apparatus. Fig. 4 is a transverse section on the line 2 2 of Fig. 3. Fig. 5 is a front elevation of the upper part of the outer fixed cylinder or casing of the apparatus, showing the indications with which the same is provided. Fig. 6 is a development of a portion of the inner drum, showing the indications with which it is provided. Fig. 7 is a vertical section of the upper and lower parts of a modified form of the outer cylinder and drums. Fig. 8 is a transverse fragmentary section on the line 3 3 of Fig. 7. Fig. 9 is a vertical section of another modified form of the apparatus. Fig. 10 is a vertical section of a still further modified form of the apparatus. Fig. 11 is a sectional detail showing the arrangement of the drums and cylinder as shown in Fig. 7.

In all the figures like letters of reference indicate similar parts.

A is the scale-beam, B the weight-pan, suspended from one end thereof, and C the goods-pan, suspended from the opposite end thereof. D is the support or standard, from which the said scale-beam A is suspended, as hereinafter described.

E is the outer fixed cylinder bearing indications representing the rates at which the goods are to be sold, and F is the drum located within the said cylinder E and bearing indications representing the monetary values of the different weights of the goods the apparatus is intended to deal with. The said cylinder E is provided with end covers $e$ $e$, the upper one of which is connected with a frame $e'$. This frame is suspended by a flexible connection $e^\times$ from the upper end of the aforesaid standard D, so that the said frame $e'$ and the cylinder E can change their position laterally with reference to the standard D, and thereby maintain a more or less truly vertical position regardless of inequalities in the level of the surface upon which the weighing apparatus stands. The lower cover $e$ of the cylinder is provided with a depression $e^2$, into which projects the upper end of a finger $e^3$, which acts to limit the extent of the lateral movement of the said cylinder. This finger $e^3$ is furnished with an india-rubber or other suitable ring $e^{3\times}$, serving as a buffer between the said finger and the surrounding depression $e^2$. The aforesaid scale-beam A has its fulcrum in a movable piece or slide $a$, which is suspended from the upper part of the said frame $e'$ by a spiral spring $a'$, said movable piece or slide being provided with lateral rollers $a^2$ $a^2$, which lie on opposite sides of the aforesaid frame $e'$, so that movement of the said movable piece or slide in a lateral direction is prevented, although it is free to participate in a vertical movement. The lower end of the said slide $a$ is formed with a hollow prolongation $a^3$, which receives at its lower extremity the nut $a^4$, which engages with a quick-threaded screw $a^5$. This quick-threaded screw is connected with a hollow spindle $f$, to which the drum F is attached by means of radial arms $f'$ $f'$, so that the said drum can turn with the said screw, the said nut $a^4$ remaining stationary in so far as rotary movement is concerned.

$e^4$ is a bracket which projects inwardly from the lower side of the upper cover $e$ of the outer cylinder and receives the lower end of the quick-threaded screw $a^5$.

The lower end of the hollow stem $f$ is provided with a conical recess, with which engages the pivot $e^5$, carried by the lower cover of the outer cylinder.

When a weight or weights are placed into the weight-pan B and a corresponding weight of goods in the goods-pan C, the combined weight thereof will act upon the scale-beam A and cause it to descend against the resistance of the spring $a'$. In so doing the nut $a^4$ will be pushed along the quick-threaded screw $a^5$ in a rectilinear manner, which will cause an angular movement to be transmitted to the said quick-threaded screw and to the drum F connected therewith, the ambit of such angular movement depending upon the extent of the downward movement of the said frame $a$ against the resistance of the spring $a'$. The angular movement of the said drum will bring one or other of its vertical columns of indications opposite the slot $e^6$ in the cylinder E and represent the monetary value of the particular weight of goods being weighed in the apparatus in accordance with the particular rate at which such goods are being sold, these rates being represented in vertical columns on beveled surfaces $e^7$ on the cylinder E at opposite sides of the slot $e^6$. For instance, if the weight of goods being sold is, say, five pounds at five cents per pound there will be found in the slot $e^6$, opposite the sign "5 cents," in the column of indications on the cylinder E, an indication of "25 cents," which represents the monetary value of the goods weighed. The upper part of the drum F is also preferably furnished with indications representing the weight of the goods in the goods-pan C, Figs. 1 and 6. After the goods have been weighed and the weights and goods removed from the apparatus the scale-beam A will return to its normal position under the action of the spring $a'$, a stop $a^6$ on the prolongation $a^3$ serving to limit the extent of the upward or vertical movement of the slide $a$ by coming against the upper cover of the cylinder E. Roller-stops $a^7$ $a^7$ are also provided which coöperate with the bracket $e^4$ for preventing the said screw and drum from being unduly shifted vertically during the return of the said slide $a$.

$a^8$ is a screw-cap by the removal of which oil can be supplied to a piece of absorbent material $a^9$, that extends into the hollow prolongation $a^3$ for the purpose of supplying lubricant to the quick-threaded screw and nut at each downward movement of the slide. The slot $e^6$ of the cylinder E is preferably glazed. When more than one drum F is employed, I may dispose them as represented in Fig. 7, where I have indicated two of such drums concentrically arranged. In this case the inner drum is connected with the hollow stem $f$ and the outer drum is connected by its lower radial arms to a pivot-piece $e^{7\times}$, supported by the pivot $e^5$, the upper radial arms of said outer drum being connected to a ring $e^{7\times\times}$, loosely surrounding the said hollow stem $f$. The outer drum is provided with a slot $f^2$, through which the indications on the inner drum can be observed through said slot $e^6$ in the cylinder E. Stops $f^3$ $f^4$ are provided, one on each of the two drums, and are so arranged that after the inner drum has made approximately a complete revolution these stops will come into contact and any further rotary movement of the said inner drum will cause the outer drum to move therewith and exhibit its indications through the slot $e^6$.

$f^5$ is a spiral spring which is connected at one end to the fixed pivot $e^5$ and at the other end to one of the arms of the outer drum. This spring is adapted to be compressed as the said outer drum is shifted by the inner drum, so that after a weighing operation the reaction of the spring will cause the said outer drum to resume its normal position together with the inner drum. If desired, a similar spring, as indicated at $f^{5\times}$ of Fig. 3, may be employed, when only one drum is used, for the purpose of taking up any looseness between the nut and quick-threaded screw that may arise by wear of these parts.

Instead of arranging the said drums F concentrically, as represented in Fig. 7, I may superimpose them, as represented in Fig. 10, in which case the aforesaid stops $f^3$ $f^4$ would be placed one near the bottom of the upper drum and the other near the top of the lower drum. The operation of the said drums would then be substantially similar to that already described with reference to Fig. 7.

In some cases it may be found advantageous to construct the apparatus so that it can be applied to one end of the scale-beam A instead of to the middle thereof. In Fig. 9 of the drawings I have represented such an arrangement. In this case the outer cylinder E is connected by a hook $e^8$ to the end of the scale-beam, and the lower end of the said cylinder is provided with a slide $e^9$, whose function is similar to that of the slide $a$ and to which the goods-pan or the weight-pan is connected. This slide is adapted to move vertically, but is prevented from angular movement by means of rollers $e^{10}$ $e^{10}$ on the stationary cylinder E engaging with wings on the said slide. Fixed to the slide is the lower end of the quick-threaded screw $a^5$, whose upper end is coupled to the spring $a'$, which is connected with the aforesaid hook $e^8$ by an eye $e^{11}$. The drum F is supported by its upper end resting through the intervention of the radial arms $f''$ upon a shoulder forming part of this eye. The lower end of said drum is connected by the radial arms $f'$ to the nut $a^4$. In this case when the slide $e^9$ is pulled downwardly by the weight in the scale-pan the quick-threaded screw $a^5$ will travel in a rectangular course without revolving, thereby transmitting rotary motion to the nut $a^4$, which will carry with it the drum F, whose indications will thus be brought opposite the slot $e^6$ of the outer cylinder E in accordance with the weight in the scale-pan.

When the apparatus is arranged as represented in Fig. 9, it would be found advantageous to provide a stop for limiting the extent of downward movement of the scale-beam A after the weighing operation has been performed, so as to prevent said beam from assuming an unnecessarily-inclined position.

I wish it to be clearly understood that although I have indicated in the drawings a quick-threaded screw and nut for converting the rectilinear movement of the slide into an angular movement of the drum or drums, I do not confine myself to such means, as any suitable device for converting rectilinear motion into rotary motion, or vice versa, may be used for my purpose.

What I claim, and desire to secure by Letters Patent of the United States, is—

1. In weighing apparatus, the combination with a scale-beam having a weight-pan at one end and a goods-pan at the other end, of a rotary device bearing indications representing monetary values, a non-rotary device bearing indications representing rates at which the goods to be weighed are sold, a spring adapted to be more or less distorted by the combined weight of the weights and goods acting on the scale-beam, and means for transmitting motion to said rotary device in accordance with the extent of distortion of said spring for the purpose specified.

2. In weighing apparatus, the combination with a scale-beam having a weight-pan at one end and a goods-pan at the other end, of a rotary device bearing indications representing monetary values, a non-rotary device bearing indications representing the rates at which the goods to be weighed are sold, a piece rectilinearly movable in which said scale-beam is fulcrumed, a spring by which said movable piece is suspended from a suitable standard and means for converting the said rectilinear movements of the movable piece into rotary movements of the said rotary device for the purpose specified.

3. In a weighing apparatus, the combination with a scale-beam having a weight-pan at one end and a goods-pan at the other end, of a plurality of rotary drums bearing indications representing monetary values, an external non-rotary casing bearing indications representing the rates at which the goods to be weighed are sold and formed with a longitudinal slot through which the monetary values on the drums are exhibited, a rectilinearly-movable slide in which said scale-beam is fulcrumed, a spring by which said slide is suspended from a suitable standard, and means for converting the said rectilinear movements of the slide into rotary movements of the drums for the purpose specified.

4. In weighing apparatus, the combination with a scale-beam having a weight-pan at one end and a goods-pan at the other end, of a plurality of concentrically-arranged rotary drums bearing indications representing monetary values, each drum excepting the innermost one being longitudinally slotted, an external non-rotary cylindrical casing bearing indications representing the rates at which the goods to be weighed are sold and formed, contiguous to said indications, with a longitudinal slot through which the monetary values are exhibited, a rectilinearly-movable slide in which said scale-beam is fulcrumed, a frame in which said slide moves and by which it is guided, a spring by which said slide is suspended from the frame, means for flexibly connecting said frame to a standard so that the drums and their casing can move laterally to assume a truly vertical position irrespective of said standard, means for limiting the extent of such lateral movement, bearings for the said drums, a central stem to which one of said drums is connected, means for converting the rectilinear movement of the slide into rotary movement and transmitting the same to said stem, means for causing the drum that is connected with the stem to impart rotary movement to the other drums, and means for returning said drums to their normal position after the weighing operation substantially as described.

5. In weighing apparatus, the combination with the scale-beam having a weight-pan at one end and a goods-pan at the other end, of a plurality of concentrically-arranged rotary drums bearing indications representing monetary values, each drum excepting the innermost one being longitudinally slotted, an external non-rotary cylindrical casing bearing indications representing the rates at which the goods to be weighed are sold and formed, contiguous to said indications, with a glazed longitudinal slot through which the monetary values on the drums are exhibited, a rectilinearly-moving slide in which said scale-beam is fulcrumed, a frame in which said slide moves, rollers on said slide engaging with said frame for guiding the slide, a spiral spring by which said slide is suspended from the frame, means for flexibly connecting said frame to a standard, a finger on said standard entering a recess in the bottom of the said cylindrical casing, bearings for the said rotary drums, a central hollow stem to which the innermost of said drums is connected, a quick-threaded screw at the upper end of said stem, a nut on said slide engaging with said screw, means for lubricating said screw and nut, projections on said drums adapted to successively impinge as each drum performs a complete revolution and to thus transmit the rotary motion of one drum to another, and a spring for returning the drums to their normal position after each weighing operation, substantially as described.

In testimony whereof I have hereunto set my hand, in presence of two subscribing witnesses, this 11th day of October, 1901.

LEONARD EUGENE COWEY.

Witnesses:
 HERBERT A. MARSHALL,
 THOS. P. WARDLE.